United States Patent
Seo

(10) Patent No.: US 6,425,300 B1
(45) Date of Patent: Jul. 30, 2002

(54) TESTING DEVICE FOR AN INSIDE DOOR HANDLE

(75) Inventor: Jeong-Min Seo, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/471,246

(22) Filed: Dec. 23, 1999

(30) Foreign Application Priority Data

Nov. 3, 1999 (KR) .............................. 99-48265

(51) Int. Cl.⁷ ..................... G01M 19/00; G01M 17/00
(52) U.S. Cl. .................................... 73/865.9
(58) Field of Search .................. 73/865.9, 865.1, 73/788, 760

(56) References Cited

U.S. PATENT DOCUMENTS 5,665,898 A * 9/1997 Smith et al. ................. 73/1.72
6,186,013 B1 * 2/2001 Gabiniewicz et al. ....... 73/865.9

OTHER PUBLICATIONS

Derwent abstract of KR 98015221A, Acc–No: 1999–227584 "Jig for open–close test of lifting–style outside door handle of automobile" inventor Kim et al, May 1998.*

Derwent abstract and clipped image of KR 98016255A, Acc–No 1999–242289, inventor Boo et al; Endurance test system for the door inside handle of an automobile, May 1998.*

Derwent abstract and clipped image of KR 9816256A, Acc–No: 1999–242290, inventor Kim et al. "Endurance test system for the door outside handle of an automobile", May 1998.*

Derwent Abstract and clipped image of KR 99021730A, Acc–No: 2000–254646, inventor Koo Connector device for endurance test of tall gate door handle, Mar. 1999.*

* cited by examiner

Primary Examiner—Thomas P. Noland
(74) Attorney, Agent, or Firm—Birch, Stewart, Kolasch & Birch, LLP

(57) ABSTRACT

A testing device of an inside door handle, the device comprising a surface plate, a plurality of support legs, a locking release device, a driving device and a control unit is mounted inside a testing car to enable an automatic test of durability and workability of an inside door handle, thereby expediting an accurate quality test of a manufactured inside door handle.

6 Claims, 4 Drawing Sheets

TESTING DEVICE FOR AN INSIDE DOOR HANDLE

BACKGROUND OF THE INVENTION

1. Field of the Invention

The present invention relates to a testing device for an inside door handle, and more particularly to a testing device for an inside door handle adapted for use in a test car to allow automatic testing of durability or workability of an inside door handle, thereby enabling accurate and swift quality tests of manufactured inside door handles.

2. Description of the Prior Art

Generally, a door mounted on a vehicle is provided with a two stage locking structure for preventing the door from opening while the vehicle is running, and all the doors are equipped with inside door handles for releasing the two stage locking state for passengers inside the vehicle to be able to open the door.

Most of the inside door handles are designed to completely release the two stage locking state of the door when a user pulls the inside door handle and the inside door handle is generally formed in a predetermined thickness of ring shape.

Accordingly, when a passenger mistakenly manipulates the inside door handle with excessive force, the inside door handle often breaks, and when the inside door handle is broken, the door cannot be smoothly opened from inside.

There is another problem in that no testing device is available for testing the durability or workability of the inside door handle mounted on the door of the vehicle, such that durability or workability of the inside door handle should be performed, not mounted on the door, thereby making it impossible to obtain accurate durability and workability of the inside handle door.

There is still another problem in that, even if the inside door handle is tested mounted on the door for durability and workability, a worker should manipulate the inside door handle item by item, taking the worker many hours in testing to thereby provide no accurate quality assurance thereto.

The present invention provides a testing device for an inside door handle constructed to include locking release means for pulling and pushing up the inside door handle slightly by way of a power externally provided, thereby releasing the two stage locking state, and driving means for continuously applying power to the locking release means, such that automatic testing of durability or workability of an inside door handle mounted of a testing car can be accurately and swiftly performed.

In accordance with the objects of the present invention, there is provided a testing device for an inside door handle, the device comprising:

a metallic surface plate;

a plurality of support legs formed at a lower side of the surface plate such that the surface plate can be horizontally maintained inside a testing car;

driving means provided with a support rod coupled to an upper side of a magnetic base detachable from and attachable to the surface plate and provided at an upper end of the support rod with a cylinder having a piston therein moving according to hydraulic pressure supplied by ON/OFF operation of a solenoid valve;

locking release means having a predetermined size of plate coupled to an inner trim of a door by way of bolts, a support axle horizontally protruded relative to the plate and first and second actuating rods for contacting the piston popping in and out at the support axle for seesaw operation, where the first actuating rod is attached by a steel wire connected to an inside handle and the second actuating rod is attached by a damper for slightly pushing the door; and a control unit for controlling a solenoid valve to repeatedly perform ON/OFF operation according to an open/close operation of a door open/close device for forcibly opening and closing the door released in locking by the locking release means when operation command is input.

Furthermore, the present invention further comprises a display unit for counting and indicating in numbers test frequency of inside door handle according to an input counting signal, whereas the control unit generates a predetermined counting signal to supply same to the display unit whenever the solenoid valve is turned on and off once.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

According to the accompanying drawings, the present invention includes support legs 2, driving means, locking release means and a control unit 30.

The support legs 2 serve to support a surface plate, where, the surface plate 1 is formed thereunder with first and second protruded angle adjusters 3 and 4 functioning as articulation at a midsection of the support legs 2.

Figure 2:
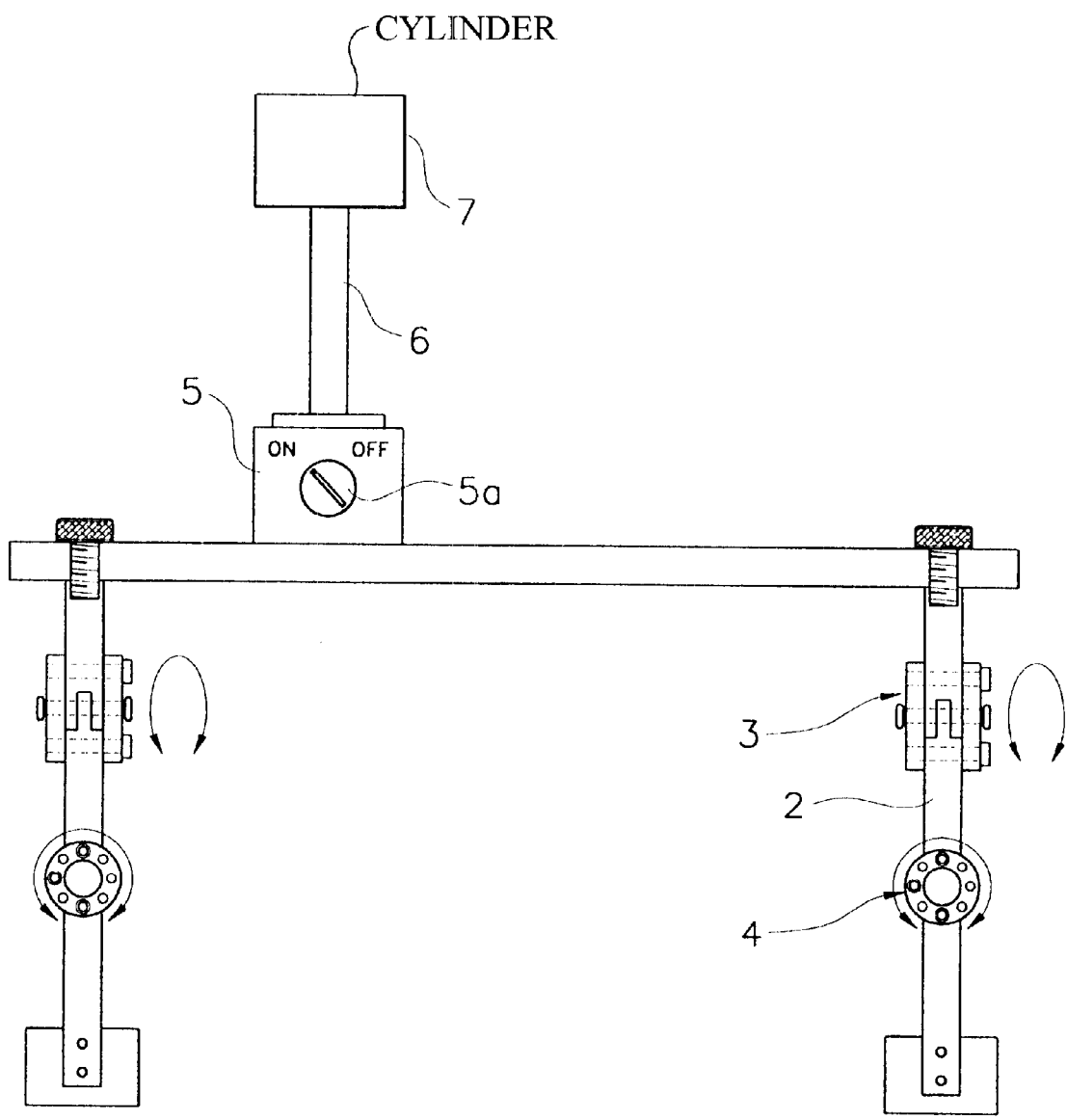
FIG. 2 is a side view for illustrating an inside door handle testing device according to the present invention.
Figure 3:
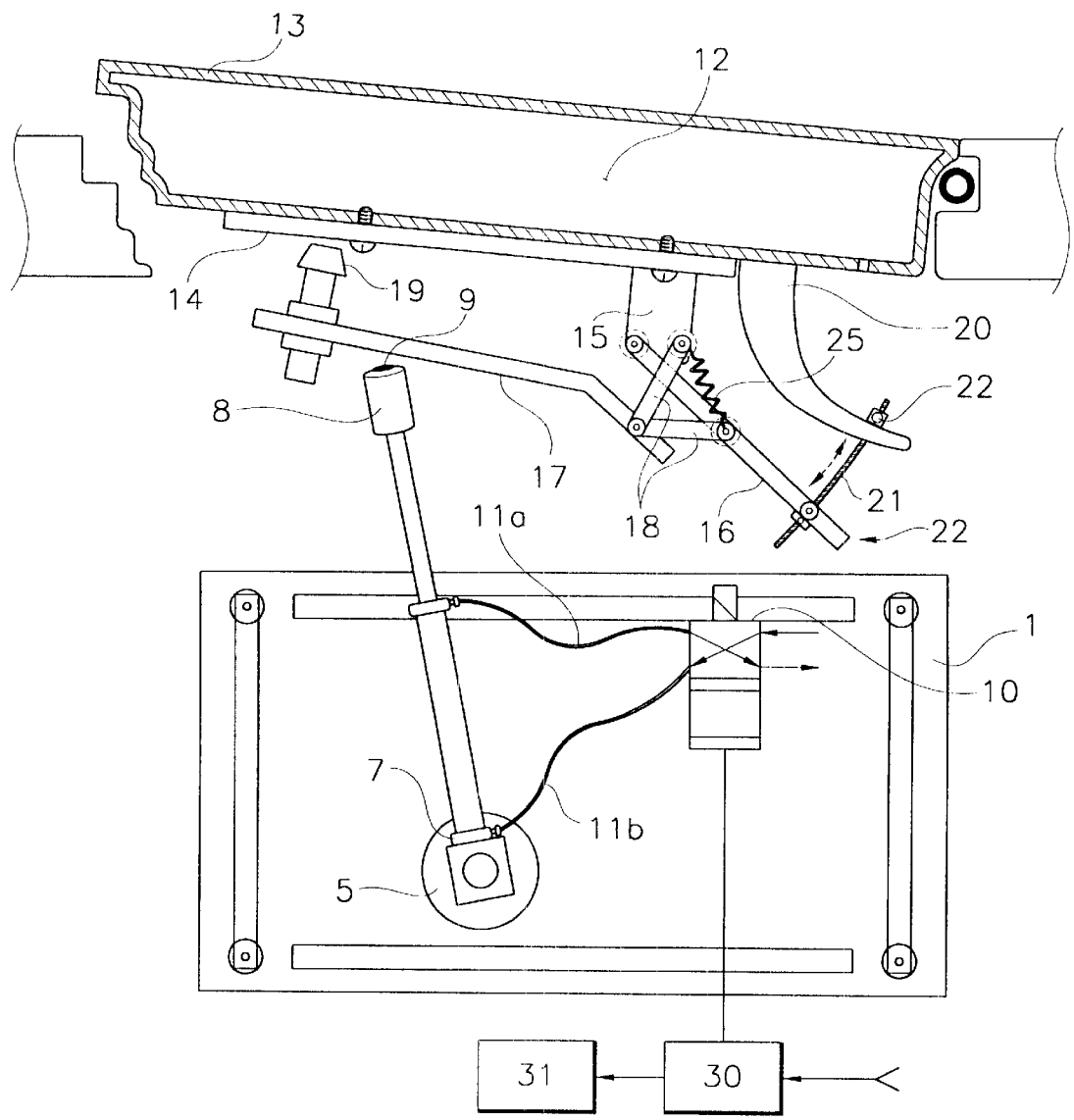
FIG. 3 is a schematic drawing for illustrating an actuation state according to the present invention.
Figure 4:
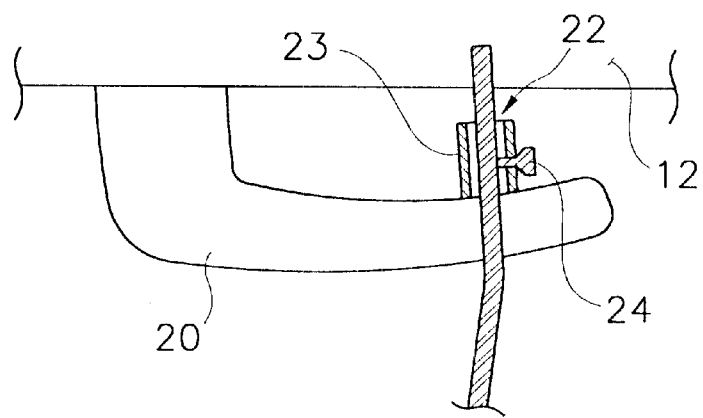
FIG. 4 is a schematic drawing for illustrating a connecting member according to the present invention.

The first and second angle adjusters attach discs before and after the bendable support legs 2, and each disc defines a plurality of holes into which stoppers such as bolts are inserted, as illustrated in FIG. 2, where, when the support legs 2 are bent to desired angles and bolts are inserted into the holes of the disc, the support legs 2 maintain the bent state.

The reason the support legs are bent at desired angles is that sizes of test cars for testing the inside door handle varies and floor surfaces on which the test cars also vary, some being flat, some being slanted and some having protruded parts, such that the support legs 2 are bent in alignments with a floor surface where the surface plate 1 is installed to make the surface plate 1 maintain a horizontal level at all times.

The driving means which supplies power for releasing two stage locking state of door at the locking release means, includes a magnetic base 5, a support rod 5 and a cylinder 7. The magnetic base 5 which is turned on and off by manipulation of a switch 5a to be magnetized is attached to an upper surface of the surface plate 1.

In other words, when a worker places the magnetic base 5 on a place the surface plate 1 wants and turns on the switch 5a, the magnetic base 5 generates a strong magnetic force, whereby, the magnetic base 5 is prevented from being detached from the surface plate 1. The magnetic base 5 is protrudingly formed thereon with a predetermined length of support rod 6, which is turn in preferred to be variable in length thereof.

The support rod 5 is mounted thereon with a cylinder 7 having a piston 8, where the cylinder 7 is connected to another solenoid valve 10 and two connecting hoses 11a and 11b to allow the piston 8 to be operated by air pressure supplied by ON/OFF operation of the solenoid valve 10, thereby transmitting power to the locking release means. The solenoid valve 10 receives power from an air tank (not shown).

Meanwhile, the locking release means actually pulls the inside handle 20 to release the door 12 from two stage locking and simultaneously push the door 12 slightly, thereby opening the door 12.

The door 12 is mounted at an inner trim 13 thereof with a predetermined size of plate 14 by way of bolt and a support axle 15 is formed vertically relative to the plate 14 to thereby define first and second actuating rods 16 and 17 for seesawing against the support axle 15.

Figure 1:
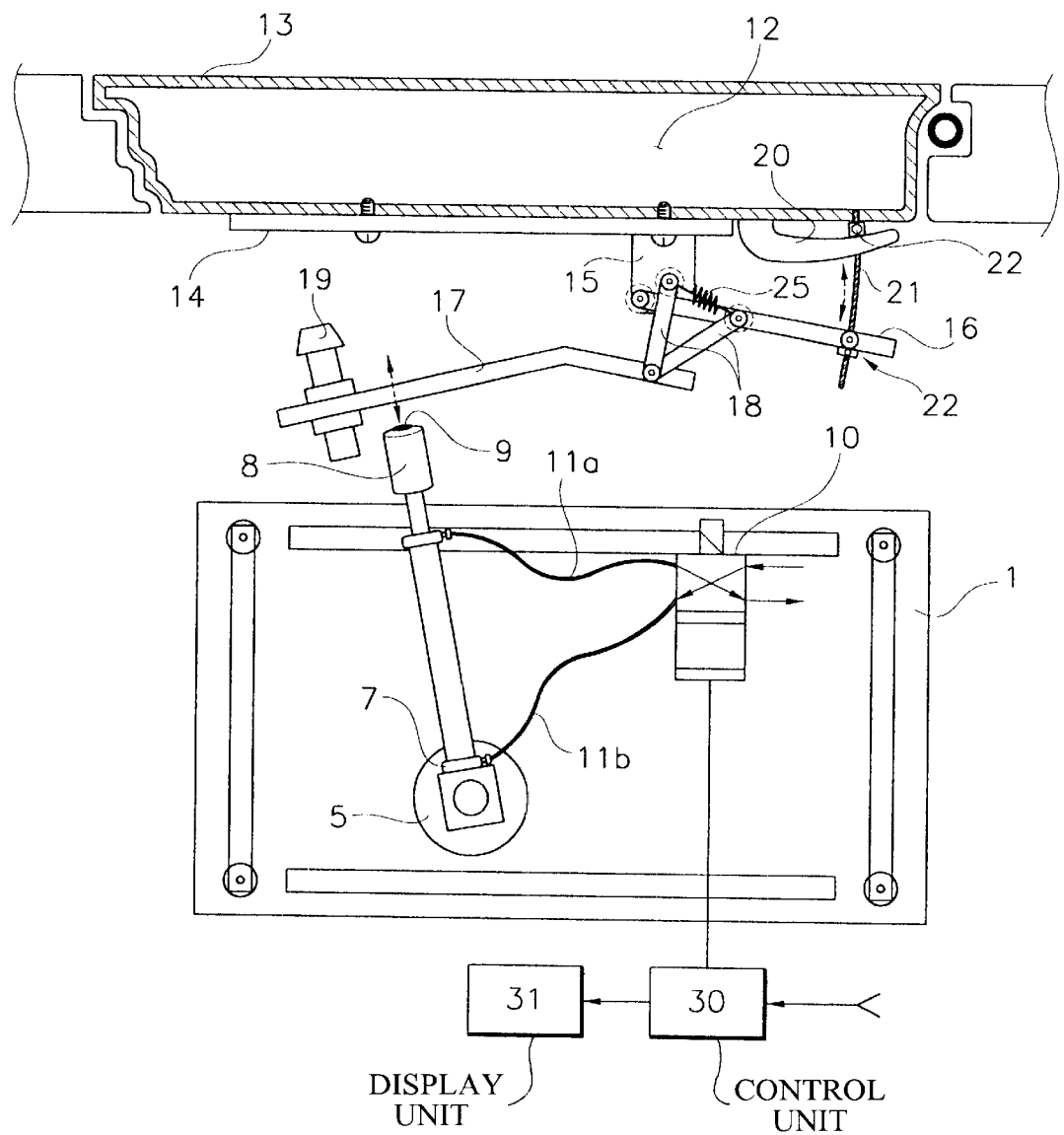
FIG. 1 is a plan view illustrating an inside door handle testing device according to the present invention.

The first actuating rod 16 is coupled toward one side of the support axle 15 and is attached at a tip end thereof to a steel wire 21 coupled to the inside handle 20 by a separate connecting member 22, and the second actuating rod 17 is connected to a midsection of the support axle 15 and the first actuating rod 16 by way of two connecting member 18 while one end thereof contacts a tip end of the piston 8 while the piston 8 moves, as illustrated in FIG. 1.

Furthermore, the second actuating rod 17 is mounted at a tip end thereof with a rubber damp 19 for slightly pushing the door 12 when the second actuating rod 17 is advanced by moving piston 8.

Figure 5:
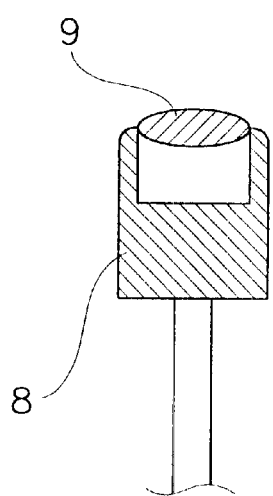
FIG. 5 is a partial sectional view for illustrating a piston according to the present invention.

At this time, the piston 8 is pressingly inserted at a tip end thereof by a rolling ball 9 as illustrated in FIG. 5 to make the rolling ball 9 roll along the surface of the second actuating rod 17 and press the second actuating rod 17, thereby reducing abrasion of the second actuating rod 17 or the piston 8 remarkably.

The steel wire 21 is attached respectively to the inside handle 20 and the first actuating rod 16 by another connecting member 22, where, the connecting member 22 defines a screw hold 24 at one end of a cylindrical body 23 for the steel wire 21 to be inserted thereinto, which enables to secure the steel wire 21 inserted into the body 23 by inserting a screw into the screw hole 24, whereby, a coupled length of the steel wire 21 may be artificially adjusted.

Meanwhile, the control unit 30 for controlling ON/OFF operation of the solenoid valve 10 outputs a control signal for pulling the inside door handle 20 by actuating the lock release means when an actuating command is input to mark the solenoid valve 10 continuously turn on and off, and the control operation of the control unit 30 can be embodied in connection with open/close operation of door open/close device for repeatedly and forcibly opening and closing the door 12 released in locking by the locking release means.

In other words, the inside handle 20 is pulled by seesawing operation of the first and second actuating rods 16 and 17 according as the piston is advanced by ON/OFF operation of the solenoid valve 10, to open the door 12 slightly, successively, the door 12 is forcibly opened and closed by open/close operation of the door open/close device, where, the control unit switches on and off the solenoid valve 10 to continuously perform two stage release operation of locking release means. By way of reference, the door open/close device for forcibly opening and closing the door is being applied to manufacturing line currently, such that drawing thereof is omitted in the accompanying Figures.

Furthermore, the control unit 30 makes it possible to continuously perform testing operation of inside handle 20 up to approximately 50,000 times once the test operation of the inside handle 20 is started.

Still furthermore, the present invention further includes a display unit 31 for indicting in numbers the testing frequency of the inside handle 20. The control unit 30 generates a predetermined counting signal to output same to the display unit 31 whenever the solenoid valve 10 is counted to display the counted number on a screen whenever the counting signal is input from the control unit 30, such that an operator can easily understand how many times the inside handle 20 has been tested.

Now, operational procedures of the present invention thus constructed will be described.

First of all, when an operator manipulates a switch to input an operation command to the control unit 30 in order to test durability and workability of the inside handle 20, the control unit 30 so controls as to turn on and off the solenoid valve 10 according to the input of the operation command, whereby, the solenoid valve 10 selectively supplies to the cylinder 7 through connecting hoses 11a and 11b the air pressure supplied from an air tank.

The piston 8 at the cylinder of is advanced by the air pressure supplied by ON/OFF operation of the solenoid valve 10, and, by this operation, the rolling ball 9 coupled to a tip end of the piston 8 contacts the second actuating rod 17 to cause the first and second actuating rods 16 and 17 to seesaw.

The first actuating rod 16 seesaws to pull the steel wire 21 and the inside handle 20, such that the door 12 is released of two stage locking state. The second actuating rod 17 slightly pushes the door 12 released of two stage locking state thereby opening the door 12.

In a state where the door 12 is relieved of the two stage locking state to slightly be opened, the door 12 is forcibly opened and closed by the operation of the door open/close device, whereby, the control unit 30 again turns on an off the solenoid valve 10 but once.

The inside handle 20 is then pulled by the seesaw operation of the first and second actuating rods 16 and 17 to release the two stage locking state. These series of operations where the two stage locking state is released are repeatedly performed to test the durability and workability of the inside door handle.

There is an advantage in the present invention in that the testing operation of the inside door handle 20 is done approximately 50,000 times per testing lot to enable an accurate test of the inside handle 20 in durability and workability. The present invention can also complete the test in much faster and more accurately than the manual test.

There is another advantage in that testing times of the inside door handle 20 are indicated on the display unit 31 to enable an operator to monitor the progress of testing operations of the inside door handle at any time.

As apparent from the foregoing, there is an advantage in the testing device of inside door handle according to the present invention in that the device comprising locking release means and driving means is mounted inside a testing car to enable an automatic test of durability and workability of an inside door handle, thereby expediting an accurate quality test of manufactured inside door handle.

What is claimed is:

1. A testing device for an inside door handle, the device comprising:

a metallic surface plate;

a plurality of support legs (2) formed at a lower side of the surface plate such that the surface plate can be horizontally maintained inside a testing car;

driving means provided with a support rod coupled to an upper side of a magnetic base detachable from and attachable to the surface plate and provided at an upper end of the support rod with a cylinder having a piston therein moving according to hydraulic pressure supplied by ON/OFF operation of a solenoid valve;

locking release means having a predetermined size of plate coupled to an inner trim of a door by way of bolts, a support axle horizontally protruded relative to the plate and first and second actuating rods for contacting the piston popping in and out at the support axle for seesaw operation, where the first actuating rod is attached by a steel wire connected to the inside handle and the second actuating rod is attached by a damper for slightly pushing the door; and a control unit for controlling a solenoid valve to repeatedly perform ON/OFF operation according to an open/close operation of a door open/close device for forcibly opening and closing the door released in locking by the locking release means when operation command is input.

2. The device as defined in claim 1, further comprises a display unit for counting and indicating a test frequency of the inside door handle according to an input counting signal, whereas the control unit generates a predetermined counting signal to supply same to the display unit whenever the solenoid valve is turned on and off once.

3. The device as defined in claim 1, wherein the steel wire is attached respectively to the inside handle and the first actuating rod by another connecting member, where, the connecting member defines a screw hold at one end of a cylindrical body for the steel wire to be inserted thereinto, which enables to secure the steel wire inserted into the body by inserting a screw into the screw hole.

4. The device as defined in claim 1, wherein the piston is pressingly inserted at a tip end thereof by a rolling ball.

5. The device as defined in claim 1, wherein the damper is made of rubber to absorb shock.

6. The device as defined in claim 1, wherein the support legs (2) are formed with partially bendable first and second angle adjusters to allow the surface plate to maintain horizontal level even an uneven floor of a car body.

* * * * *